(12) United States Patent
Arrouye et al.

(10) Patent No.: US 7,171,674 B2
(45) Date of Patent: *Jan. 30, 2007

(54) METHOD AND APPARATUS FOR "JUST-IN-TIME" DYNAMIC LOADING AND UNLOADING OF COMPUTER SOFTWARE LIBRARIES

(75) Inventors: Yan J. Arrouye, Cupertino, CA (US); Sean J. Findley, Gilroy, CA (US); Keith L. Mortensen, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 734 days.

This patent is subject to a terminal disclaimer.

(21) Appl. No.: 09/943,900

(22) Filed: Aug. 30, 2001

(65) Prior Publication Data
US 2004/0015877 A1    Jan. 22, 2004

Related U.S. Application Data

(63) Continuation of application No. 09/162,625, filed on Sep. 29, 1998, now Pat. No. 6,314,566.

(51) Int. Cl.
*G06F 9/445* (2006.01)
(52) U.S. Cl. ............ 719/331; 719/332; 717/163; 717/166
(58) Field of Classification Search ............. 719/331, 719/332; 717/100–178
See application file for complete search history.

(56) References Cited

U.S. PATENT DOCUMENTS

| 4,695,949 | A | * | 9/1987 | Thatte et al. ............... 707/206 |
| 5,410,698 | A | | 4/1995 | Danneels et al. ............ 395/650 |
| 5,414,854 | A | | 5/1995 | Heninger et al. ............ 395/700 |

(Continued)

OTHER PUBLICATIONS

RD 408021 A, Apr. 1998.*

(Continued)

*Primary Examiner*—Lewis A. Bullock, Jr.
(74) *Attorney, Agent, or Firm*—Blakely, Sokoloff, Taylor & Zafman LLP

(57) ABSTRACT

A method and system for providing "just-in-time" dynamic loading and unloading of libraries. Library code is loaded into memory just prior to the actual execution of a routine in that library and is unloaded from memory after the execution of the library routine is completed. According to the present invention, a library structure having a library loader and a library implementation module. The library loader provides the same entry points as the library itself and contains code to drive the loading and unloading of the library implementation module which actually contains the code to implement the library call. At the beginning of the execution of an application or other software module, the library loaders for libraries needed by that application or other software module, are loaded into memory and unloaded upon completion of that application or other software module. The library loaders control the loading and unloading of the library implementation modules, which contain the actual code which implements the library call, so that the library code itself is only in memory while in use during execution of the library call. A sequence of library calls to the same library is preferably detected and managed so as to avoid unnecessary unloading/reloading of the same library.

38 Claims, 3 Drawing Sheets

U.S. PATENT DOCUMENTS

| | | | | |
|---|---|---|---|---|
| 5,561,800 | A | | 10/1996 | Sabatella .................... 395/700 |
| 5,615,400 | A | * | 3/1997 | Cowsar et al. .............. 719/332 |
| 5,708,811 | A | | 1/1998 | Arendt et al. ................ 395/712 |
| 5,838,972 | A | | 11/1998 | Matsuzuka et al. ......... 395/685 |
| 5,901,315 | A | | 5/1999 | Edwards et al. ............ 395/704 |
| 5,953,534 | A | | 9/1999 | Romer et al. ................ 395/712 |
| 5,960,204 | A | | 9/1999 | Yinger et al. ................ 395/712 |
| 6,154,878 | A | * | 11/2000 | Saboff ......................... 717/173 |
| 6,279,029 | B1 | * | 8/2001 | Sampat et al. .............. 709/203 |
| 6,308,184 | B1 | * | 10/2001 | Hewitt ........................ 707/205 |
| 6,314,566 | B1 | * | 11/2001 | Arrouye et al. ............. 717/148 |
| 6,629,113 | B1 | * | 9/2003 | Lawrence ................... 707/206 |
| 6,681,216 | B2 | * | 1/2004 | Hewitt ........................... 707/1 |
| 6,681,263 | B1 | * | 1/2004 | King ........................... 719/315 |
| 6,708,330 | B1 | * | 3/2004 | Moberg et al. ............. 717/158 |

OTHER PUBLICATIONS

Jones, Richard et al. "Garbage Collection: Algorithms for Automatic Dynamic Memory Management." Chapters 2-3. 1996.*

IBM Technical Disclosure Bulletin. "Management of Multiple Shared Library Segments." Oct. 1, 1989.*

Microsoft Corporation. "The Component Object Model Specification." Oct. 24, 1995.*

IBM Technical Disclosure Bulletin. "Management of Multiple Shared Library Segments." Oct. 1989.*

*Inside Macintosh*, vol. I, Addison-Wesley Publishing Company, 1985, pp. I-12, I-13.

*Inside Macintosh*, vol. II, Addison-Wesley Publishing Company, 1985, pp. II-53-, II-55 to II-64.

*Inside OS/2*; Gordon Letwin, Microsoft Press, 1988, pp. 89-116, Chapter 7.

*OS/2 Programmer's Guide*, Ed Iacobucci, Osborne McGraw-Hill, 1988, pp. 131-138.

*Mapping Imported Symbols at Link Time to Improve Load Time on the Office Systems/2 Operating System*, IBM Technical Disclosure Bulletin, IBM Corporation, 1995, pp. 539-540.

*The Open Group Releases High Performance Java™ Byte Code Compiler for HP's HP-UX Operating System*, PR Newswire, Dec. 1997, p1203NEW034, 3 pp.

*Method and Mechanism for Dynamic Loader*, IBM Technical Disclosure Bulletin, IBM Corporation, 1992, pp. 8-13.

\* cited by examiner

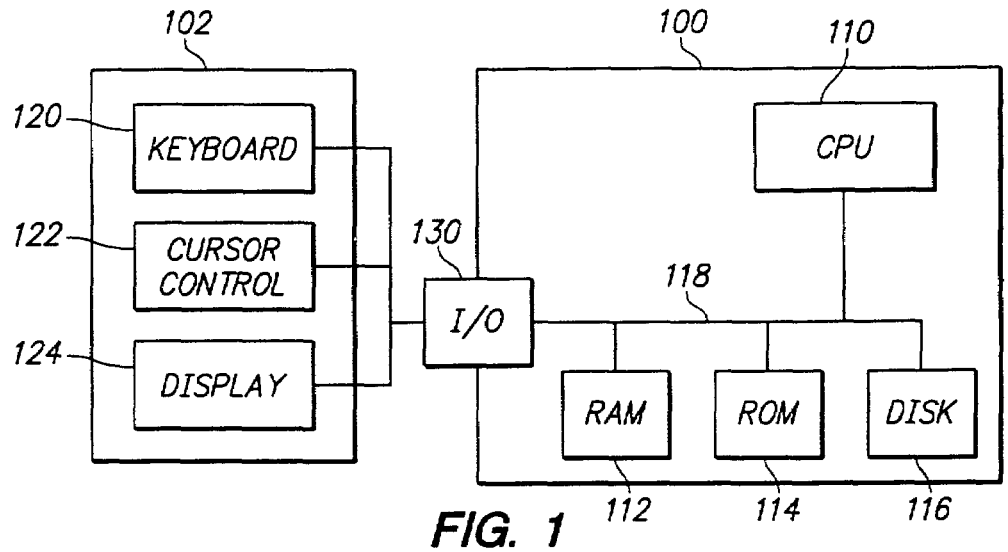
FIG. 1
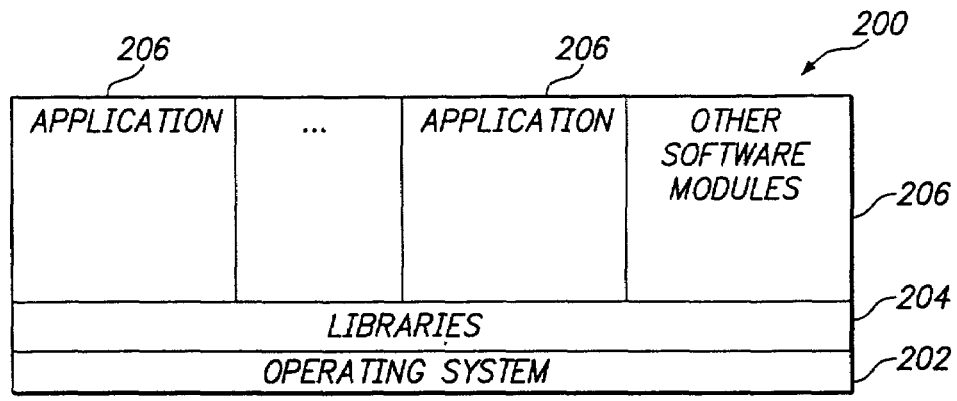
FIG. 2
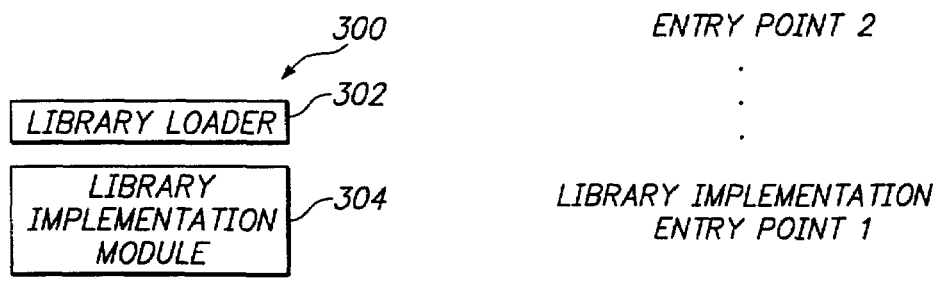
FIG. 3
LIBRARY LOADER
ENTRY POINT 1
ENTRY POINT 2
.
.
.
LIBRARY IMPLEMENTATION
ENTRY POINT 1
ENTRY POINT 2
.
.
.
FIG. 4

_US 7,171,674 B2_

METHOD AND APPARATUS FOR "JUST-IN-TIME" DYNAMIC LOADING AND UNLOADING OF COMPUTER SOFTWARE LIBRARIES

The present application is a continuation of prior application Ser. No. 09/162,625, filed Sep. 29, 1998 now U.S. Pat. No. 6,314,566.

RELATED PATENT APPLICATIONS

The present patent application is related to commonly assigned U.S. patent applications Arrouye, et al., U.S. patent application Ser. No. 09/161,758, issued as U.S. Pat. No. 6,230,310 for "A METHOD AND SYSTEM FOR TRANSPARENTLY TRANSFORMING OBJECTS FOR APPLICATION PROGRAMS", Arrouye et al., U.S. patent application Ser. No. 09/162,125 issued as U.S. Pat. No. 6,486,897 for "A MULTI-REPOSITORY DISPLAY SYSTEM USING SEPARATE PRESENTATION,ADAPTATION AND ACCESS LAYERS", and Arrouye et al., U.S. patent application Ser. No. 09/162,126 issued as U.S. Pat. No. 6,532,472 for "PERSISTENT STATE DATABASE FOR OPERATING SYSTEM SERVICES", the disclosures of which are herein incorporated by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

The invention relates generally to the loading and unloading of software library modules on a computer system and, more specifically, to a method and apparatus for dynamically loading and unloading software library modules as needed on a "just-in-time" basis.

BACKGROUND OF THE INVENTION

Generally, a software library module (herein called a "library"), a collection of software routines, is formed so that software routines can be used by a plurality of applications without rewriting the software routines for each application. There may be a plurality of libraries and each library can be either shared or non-shared. A shared library is one which can be used by more than one application. A non-shared library is one which is only used by the application that calls it. Traditionally, shared libraries are dynamically loaded during runtime, while non-shared libraries are linked into a program during creation of the program's executable file.

Some systems dynamically load libraries which are needed by applications or other software modules. For example, when loading a particular software application or module, herein denoted as "Software A" for illustrative purposes only, these systems check whether there are any libraries which will be needed in order to execute Software A. These systems then load those needed libraries into memory, load Software A into memory and begin execution of Software A. The libraries remain loaded in memory until execution of Software A completes. After the execution of Software A is complete, Software A and the loaded libraries are unloaded from memory.

The loaded libraries in the above example occupy memory space during the entire execution of Software A, regardless of whether Software A uses them all of the time. Even if Software A were to use a particular library for only a fraction of the execution time of Software A, that particular library would remain loaded in memory for the entire execution of Software A, resulting in an undesirable waste of memory resources.

Thus, depending on the amount of usage of a library by a particular application or module, the above approach undesirably results in inefficient use of memory resources. It is desirable therefore, to provide a mechanism, which is capable of loading libraries in a manner which promotes efficient use of memory resources.

SUMMARY OF THE INVENTION

Briefly, in accordance with the present invention, this objective, among others, is achieved by a method and system which provides "just-in-time" dynamic loading and unloading of libraries. A library is loaded into memory just prior to the actual execution of a routine in that library and is unloaded from memory when the execution of the library routine is completed. Thus, a library occupies memory while in use during execution of a routine in that library and does not unnecessarily occupy memory during periods of non use when no routines in that library are executing.

To achieve "just-in-time" loading of libraries, the present invention extracts the entry points of the library and each library is split into two components, a library loader and a library implementation module. The library loader provides the same entry points as the library and contains code to drive the loading and unloading of the library implementation module which actually contains the code to implement the library call. Preferably, at the beginning of the execution of an application or other software module, the library loaders for libraries needed by that application or other software module, are loaded into memory and unloaded upon completion of that application or other software module. The library loaders control the loading and unloading of the library implementation modules, which contain the actual code which implements the library call, so that the library code itself is only in memory while in use during execution of the library call.

According to an aspect of the invention, a sequence of library calls to the same library is detected and managed so as to avoid unnecessary unloading/reloading of the same library and to avoid substantially degrading execution performance.

By deferring the loading of a library until just prior to when a routine in the library is actually executed by the application or other software module, the present invention advantageously provides more efficient use of memory resources. By only loading into memory at any given time libraries which are actually in use, the invention reduces the overall memory requirement to execute a particular application or other software module. This produces the further advantages of either being able to execute more software in the same amount of memory or in being able to execute the same software in less memory, ultimately reducing the cost of producing the device that runs the code module.

Although the invention is particularly advantageous in hardware/software systems with limited memory, the advantages of the invention can be realized in other hardware/software systems as well.

These and other features of the present inventions, and the advantages offered thereby, are explained in detail hereinafter with reference to specific embodiments illustrated in the accompanying drawings.

BRIEF DESCRIPTION OF THE DRAWINGS

FIG. 1 is a general block diagram of a computer system incorporating the invention;

FIG. 2 illustrates software components of a computer system incorporating the invention;

FIG. 3 is a block diagram illustrating a library structure;

FIG. 4 illustrates a library loader having the same entry points as its corresponding library;

DETAILED DESCRIPTION

Figure 5:
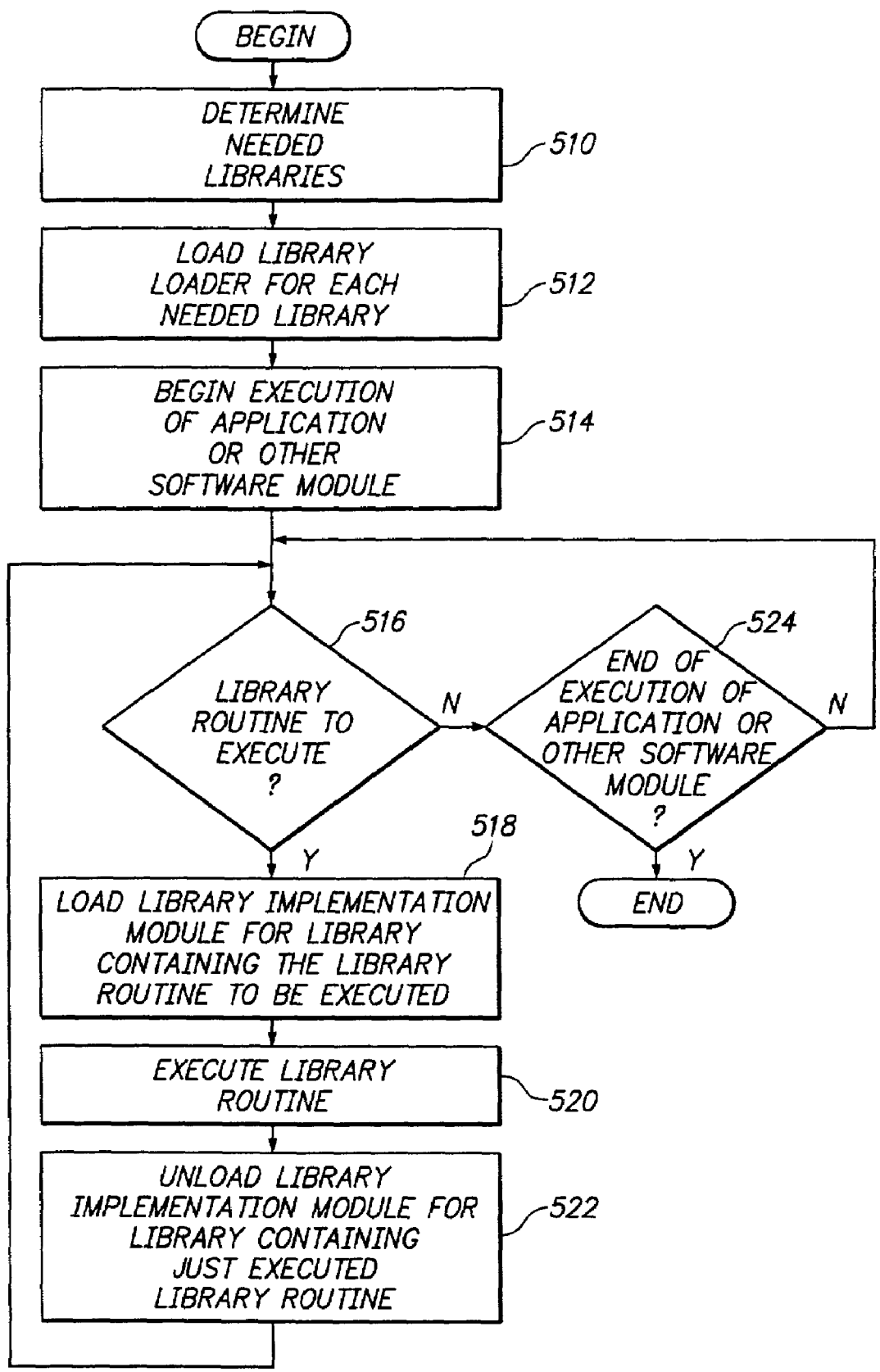
FIG. 5 is a flowchart generally depicting the steps performed in during a general loading and unloading of a library.

To facilitate an understanding of the present invention and the advantages offered thereby, features of the invention are described and illustrated with reference to the use of the invention in a computer running the Mac OS operating system developed by Apple Computer, Inc. It will be appreciated by those having familiarity with the relevant technology, however, that the principles of the present invention are not limited to this particular operating environment. Rather, the invention can be beneficially employed within any type of computer operating environment in which software libraries are dynamically loaded during run-time.

The following description is presented to enable one of ordinary skill in the art to make and use the invention and is provided in the context of a patent application and its requirements. Various modifications to a preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

FIG. 1 is a block diagram illustrating an exemplary computer system, of the type in which the present invention can be employed. The exemplary system includes a computer 100 connected to one or more external peripheral devices 102. The computer 100 includes a central processing unit 110, a main memory which is typically implemented in the form of a random access memory 112, a static memory that can comprise a read only memory 114 and a permanent storage device, such as a magnetic or optical disk 116. The computer 100 could be, for example, a PowerPC or G3 computer, developed by Apple Computer, Inc.

The CPU 110 communicates with each of these forms of memory through an internal bus 118. The one or more peripheral devices 102 include, but are not limited to, a data entry device such as a keyboard 120, a cursor control device 122 such as a mouse, a trackball, a pen and stylus, a touch-sensitive screen, a trackpad, a microphone, a joystick, a camera or the like, a display device 124 and, optionally, an audio device such as speakers (not shown). The display device 124, such as a CRT monitor or an LCD screen, provides a visual display of the information that is being processed within the computer. Each of these external peripheral devices communicates with the CPU 110 by means of one or more input/output ports 130 on the computer 100. Input/output ports 130 also allow computer 100 to interact with a local area network server, an external network, such as the Internet, or an external storage device.

FIG. 2 illustrates software 200 used in conjunction with computer 100 embodying the present invention. This software 200 typically includes an operating system 202, at least one library 204, and at least one software module 206 such as, for example, an application. The operating system 202, such as Mac OS, typically controls the allocation and usage of the hardware resources such as memory, central processing unit time, disk space and peripheral devices. Alternative operating systems which could be used with other computers include, but are not limited to, Windows 95, Windows 98 or Unix. Alternatively, other software, besides operating systems, which happens to perform the function of loading and unloading libraries from memory can utilize the present invention.

The operating system 202 is typically stored in permanent memory, such as for example disk 116 of FIG. 1, and loaded into random access memory, such as for example RAM 112 of FIG. 1, for execution. For a particular software module 206, the operating system loads libraries 204 needed during execution of that particular software module 206 into RAM 112 for use during execution of the particular software module 206.

When an application or other software module references a library routine in such a way that that execution of that application or other software module directly causes execution of that library routine, it is common to say that the application or other software module "calls" that library routine. It is also common to denote the execution of the library routine as a "library routine call". Typically an application programmer's interface, otherwise known as an "API", is used to refer to a set of entry points that provide a particular function. An entry point is used to call a particular routine. The entry point typically defines and identifies the routine being called and any arguments, parameters or other information that is being passed to the library routine. A library is a collection software routines, each routine having its own entry point.

The present invention provides for "just in time" dynamic loading and unloading of software libraries. In other words, libraries are loaded into memory as they are needed, rather than being held in memory during an entire execution of an application or other software module. In particular, the actual code for a particular library is loaded into memory just prior to when a library routine from that library is executed by the application or other software module.

To achieve this objective, among others, the present invention provides a library loader for each library. The library loader for a specific library provides the same entry points as that specific library and contains code to drive the loading and unloading of the library implementation module which actually contains the code to implement the library call.

The library loaders for libraries needed by an application or other software module, are loaded into memory at a time which is prior to execution of any of the needed libraries and unloaded upon completion of that application or other software module. The library loaders are loaded, for example, at or near the beginning of the execution of an application or other software module. In other embodiments the loading of library loaders may not be after execution of the application or other software module begins, but occurs at least some time prior to use of any of the needed libraries. In other embodiments, the loading of a particular library loader occurs at any time prior to the execution of a routine in that library by the application or other software module.

Each library loader controls the loading and unloading of the actual code which implements the library call, so that the library code itself is only in memory while in use during execution of the library call.

According to an aspect of the invention, the above library loader mechanism can be implemented using a library structure. As shown in FIG. 3, a library structure 300 comprises a library loader 302 and a library implementation module 304. Library loader 302 contains the same entry points, as illustrated in FIG. 4, as those of the library, as well as code for loading and unloading the library implementation module 304. Library implementation module 304 contains the actual code which implements the library call.

Generally, as shown in FIG. 5, the library loader 302 (FIGS. 3 and 4) for a particular library is preferably loaded into memory just prior to, at the start of, or closely after the execution of an application or other software module referencing the particular library. As previously discussed, the timing of the loading may vary based on the particular implementation as long as the library loader is loaded prior to execution of the corresponding library call.

At step 510 it is determined which libraries may potentially be needed during execution of the application or other software module. The mechanism used for determining which libraries may be needed, where the information is stored and how it can be accessed, is typically run-time dependent. Typically, each executable application or other software module contains a table indicating which libraries are needed to run the executable application or other software module. This table can be, for example, a table of strings, each string being a name of an external library that is needed to run the executable application or other software module. The name is then used to find the physical storage for the imported library. Alternatively, the table can include symbols not contained in the executable application or other software module to indicate of external binary symbols/libraries used by the executable application or other software module. Other suitable data structures besides a table can be used as well.

According to the invention, this table, or other suitable data structure, is traversed to determine which library loaders to load. The library loaders for libraries which are indicated by the table or other suitable data structure as being needed by the application or other software module during execution are loaded into memory. Preferably this occurs just prior to, at or otherwise near the launch of the application or other software module. Alternatively, the loading of library loaders may occur at a time subsequent to, but not near to, the launching of the application or other software module and before the execution by that application or other software module of a routine contained in a dynamically loaded library. As is well understood by someone of ordinary skill in the art, any suitable method can be used to access and traverse the table or other suitable data structure.

At step 512, the library loader for each potentially needed library is loaded into memory. At step 514 the execution of the application or other software module begins. Alternatively, Step 514 may precede steps 510 and 512 such that steps 510 and 512 are executed as part of execution of the application or other software module, at the beginning of such execution.

At step 516 when a library routine is executed, control passes to step 518. Since the library loader 302 contains the same entry points as the library (in effect, the library implementation module 304), when a library call is encountered during execution of the application or other software module, the library call results in the library loader for that library being invoked. The library loader then loads the library implementation module for the library at step 518. Once loaded, the library implementation module executes the library call at step 520. After the execution of the library call is completed, the library loader unloads the library implementation module at step 522 and control is transferred back to the application or other software module and execution proceeds at step 516. If at step 516 a library routine is not executed, then the application or other software module executing proceeds until a library routine call is encountered at step 516 or until execution of the application or other software module is completed at step 524.

Figure 6:
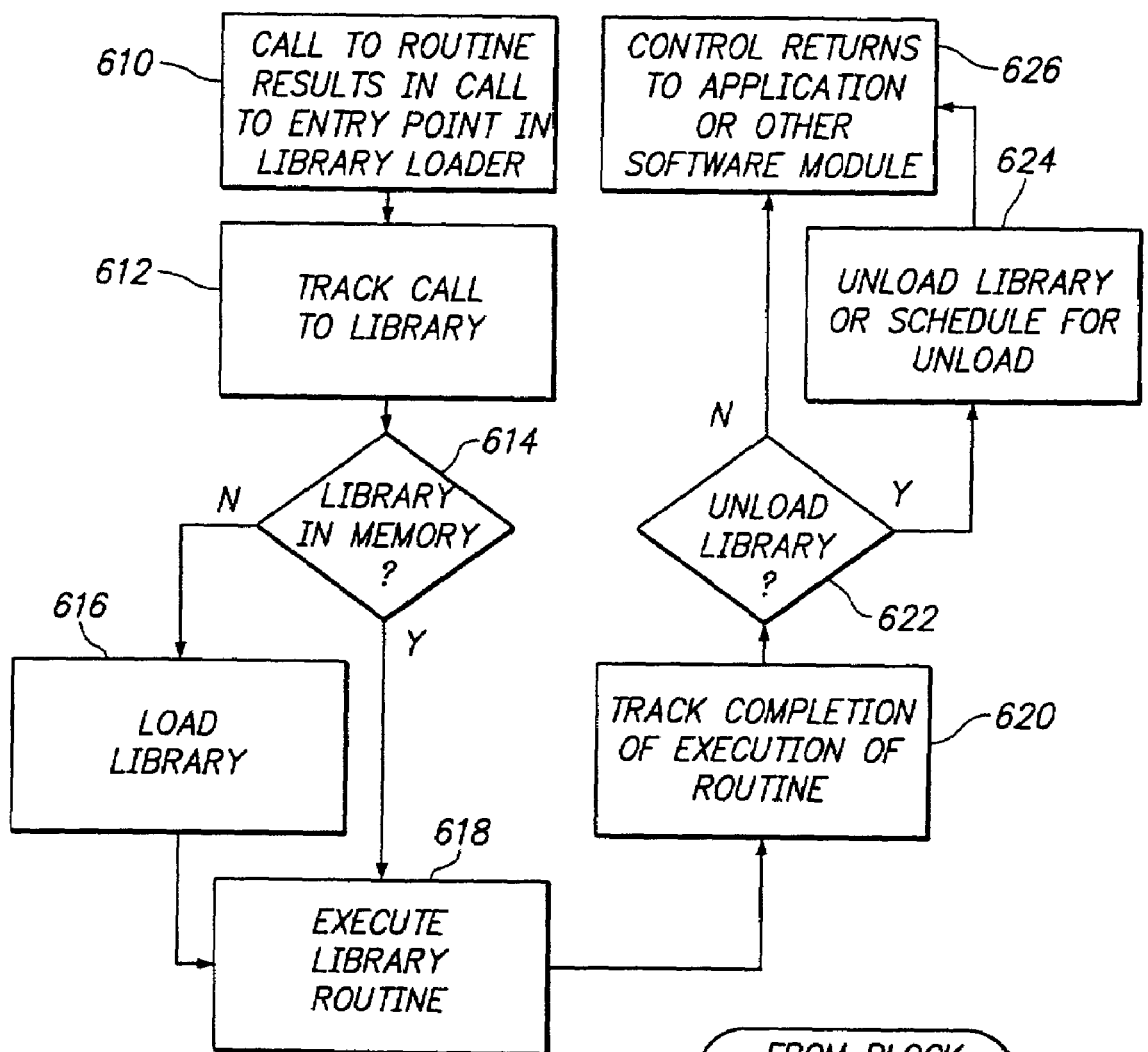
FIG. 6 is a flow chart generally depicting the steps performed a more sophisticated loading and unloading a library.

Preferably, prior to loading a library implementation module into memory, the library loader first determines whether the library implementation module is already loaded in memory. FIG. 6 is a flowchart generally depicting the steps performed during the loading and unloading of a library in this manner.

As shown in FIG. 6, at step 610, an application or other software module containing a call to a routine in a library actually calls a corresponding routine in a library loader for a library. Preferably, the corresponding routine in the library loader has an entry point identical to that of the routine in the library. Preferably, this library loader is already resident in memory. At step 612, the library loader keeps track of another call to the routine. Preferably, this is accomplished by maintaining a use count for the library. In that case, the library loader increases the use count for the library to indicate that another call to the routine has been made. Typically, this step entails incrementing a use count by a specific value, hereafter referred to as an "incrementing value". For example, the incrementing value can be one (1).

At step 614, it is determined whether the library implementation module for the library is already loaded into memory. This determination can be based on the use count. When the use count is less than the incrementing value, it indicates that the library implementation module for the library is not already loaded into memory (in other words, it indicates a value of zero (0) prior to step 612). When the use count is greater than or equal to the incrementing value, it indicates that the library implementation module for the library is already in memory. If the library implementation module for the library is not already in memory, it is loaded into memory at step 616.

In either case, processing then continues at step 618 wherein the routine in the library implementation module for the library is executed and control returns to the routine in the library loader. At step 620, the routine in the library loader indicates that execution has completed, preferably by decreasing the use count of the library by the incrementing value. At step 622, it is determined whether the library implementation library for the library should be unloaded from memory. Typically, this is accomplished by checking whether the use count for the library is equal to zero (0), indicating that the library is no longer being used. If it is determined that the library implementation library for the library should be unloaded from memory, then at step 624, the library implementation module is either unloaded or scheduled for unloading, depending on the embodiment of the invention. In either case, control then returns to the application or other software module at step 626.

Figure 7:
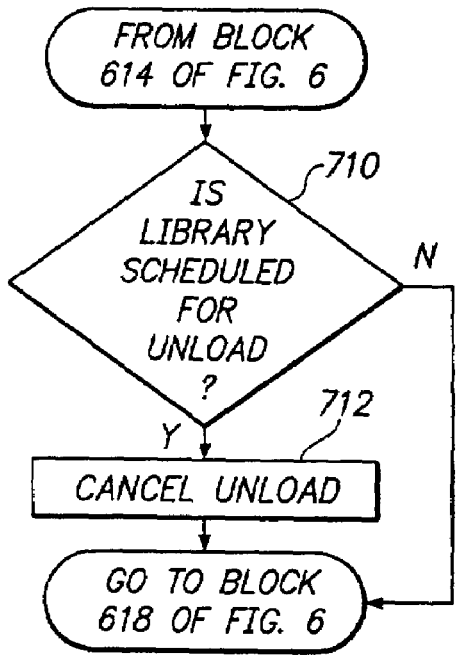
FIG. 7 is a flow chart depicting the steps performed in an embodiment of the invention between blocks 614 and 618 of FIG. 6 when 6 the determination at block 614 is that the library is in memory.

According to an aspect of the invention, the above method and system can be modified to account for sequences of library calls that might result in repeated loading and unloading of the same library implementation modules. Rather than unloading a library at step 624 of FIG. 6, the library is scheduled for unloading. Additionally, the steps shown in FIG. 7 are performed in between steps 614 and 618 of FIG. 6 when the determination at block 614 is that the library is in memory. This aspect of the invention can advantageously be used to avoid substantially degrading execution performance.

As shown at step 710, it is determined whether the library implementation module for the library is scheduled to be unloaded. If so, then at step 712, the unload is cancelled. The specific mechanism for canceling an unload depends on the particular implementation. If a flag is used to indicate that a library implementation module is scheduled for unload, then the flag is set to indicate cancellation of that unload. If a use count, rather than a flag, is used, the use count is incremented in order to cancel the unload. Other mechanisms, depending on the implementation, can be used.

In either case, control returns to block 618 of FIG. 6 where the library routine is then executed and the subsequent steps of FIG. 6 are then performed as previously described.

The determination that a library is scheduled for unloading can be implemented in a variety of ways. In an embodiment of the invention a flag can be used for each library to indicate whether the library is scheduled for unloading. In an alternative embodiment of the invention, a use count can be used. For example, the use count can be a counter which is incremented every time the library is executed and decremented every time the library completes execution. If the use count equals zero and the library is loaded in memory, then the library is considered to be scheduled for unload.

The delay imposed between scheduling a library for unloading and actually unloading the library is a trade-off between using memory resources longer and assuming the risk of having to unload and reload a library. In an embodiment of the invention, the actual unloading of a library is delayed for a fixed, pre-determined time period, thereby allowing subsequent calls to that library to occur within that time period without unloading and reloading of the library. For example, a time delay of two milliseconds can be used. If at the end of the delay the library is still not in use, e.g. the use count equals zero, then the library is unloaded from memory. If the library is in use, then the unload is cancelled.

The determination of a suitable time delay preferably takes into account the cost of loading and unloading a library. Generally, the higher the cost of loading and unloading a library, the longer a library should be maintained in memory, i.e. the longer the time delay should be, just in case the library is subsequently called again.

Alternatively, each call to the library can reset the delay. For example, if the delay is set at two milliseconds, then a library which is scheduled for unloading will be deleted after two milliseconds unless it is referenced again during that delay. If the library is referenced again during the delay, then when the library is then later rescheduled for unloading, the delay is reset to two milliseconds.

In other embodiments, variable, rather than fixed, pre-determined delays may be used. Alternatively, the handling of scheduled unloading might be based on criteria other than time. Such criteria can include, but is not limited to, system resources such as process scheduling or deferred execution.

The following example illustrates the invention in operation for an application or other software module, denoted as "Module A". In this example there are two libraries, Library A and Library B. Library A contains Routine A and Library B contains Routine B. The tracking of library usage is achieved by appropriately incrementing and decrementing a use count for each library. The use count for each library is initialized to zero (0).

Module A contains three library calls shown in pseudocode as follows:

---

Module A
        BEGIN;
            CALL Routine A;
            CALL Routine B;
            CALL Routine B;
        END;

---

In operation, prior to or contemporaneous with the execution of Module A, the library loaders for Library A and Library B are loaded into memory. The "CALL Routine A" results in execution of a routine in the library loader for Library A, the routine corresponding to Routine A in the library implementation module for Library A, e.g. the routine with the same entry point as Routine A. The library loader routine increments a use count by an incrementing value. It is then determined whether the use count equals the incrementing value, indicating that the library implementation module is either not in memory or is scheduled to be unloaded. If the use count equals the incrementing value, then it is determined whether the library implementation module is in memory, but scheduled to be unloaded. If so, then the unload is cancelled. If the library implementation module is not in memory, it is loaded into memory. In this case, the use count equals the incrementing value, so the library implementation module is loaded into memory.

Once the library implementation module is loaded into memory or once it is determined that the library implementation module is already in memory, the Routine A is executed. After Routine A completes execution, control returns to the routine in the library loader for Library A which decreases the use count of Library A by the incrementing value. In this case, the use count is then equal to zero (0).

It is then determined whether the use count for Library A equals zero (0). If so, Library A is scheduled to unload and control returns to Module A. If the use count does not equal zero (0), then control returns to Module A. In this case, the use count is equal to zero (0), so Library A is scheduled to be unloaded.

The "CALL Routine B" code is then executed in a similar fashion to the "CALL Routine A" code discussed above.

The second "CALL Routine B" code is also executed in a similar manner to the previous calls, except that in this case, the library implementation module is found to be already loaded into memory, but scheduled for unloading. Therefore, the unloading is cancelled. Thus, a sequence of calls to the same library does not result in unnecessary unloading and reloading of the library. Rather the library is maintained in memory for execution of the sequence of calls and is then unloaded.

The above example illustrates that the present invention more efficiently utilizes memory resources because the size of a library loader is typically significantly smaller than the size of a library and a library typically does not occupy memory resources when no routines in that library are executing. Additionally, aspects of the invention provide for this efficient use of memory resources without incurring significant processor and I/O (disk) overhead for unnecessary loading and unloading, as might occur during a sequence of calls to the same library. This efficient use of memory resources means that more applications can execute within a given memory resource or that less memory needs to be available to execute a particular set of applications.

The invention can be used in any computer software environment in which software libraries or the like are dynamically loaded during runtime. The invention is not limited to use with shared libraries, but can be used with other types of libraries, code or the like, such as non-shared libraries, so long as the other types of libraries are dynamically loaded during runtime, rather than linked with the program during creation of the program's executable file.

The invention can be incorporated directly into an operating system or can be employed separately at another software layer above the operating system and even at the application level. For example, the invention can be used in a Navigation Services context as described in co-pending, commonly-assigned patent applications Arrouye, et al., U.S. patent application Ser. No., "An Application Programming Interface Adapted To Transform Objects For An Application Program", the disclosure of which is herein incorporated by reference.

The Navigation Services provides an API and associated software libraries which provide services that allow applications or other software modules and their end-users to access, display and otherwise manipulate a variety of software objects, such as, but not limited to, files, databases, FTP objects, and/or other information.

Navigation Services implements the present invention by implementing two libraries, a Navigation Services Loader ("NS Loader") and a Navigation Services Implementation Module ("NSIM"). The Navigation Services API's are exported into a NS Loader which is a library loader as previously described. For each entry point in the Navigation Services API, the NS Loader contains a corresponding entry point. Each entry point into the library contains code to control the loading and unloading of the library implementation module for the library containing the code to implement the routine to which the entry point corresponds. That library implementation module is loaded into memory if that library implementation module is not already in memory. In either case, the routine in the library implementation module which corresponds to the entry point in the NS Loader is then executed.

For example, among other features and API's, the Navigation Services provides a "get file" ("NavGetFile") and a "put file" ("NavPutFile") interface. The "get file" interface provides access to a software object, while the "put file" provides for the local storing of software objects. Among other entry points, the NS Loader contains an entry point for NavGetFile and for NavPutFile. In operation, when an application makes a NavGetFile call, a call is made to the NavGetFile entry point in the NS Loader. The NavGetFile entry point has associated code for controlling the loading and unloading of the NSIM which contains the actual code for executing the NavGetFile routine. If the NSIM is not already in memory, then the NSIM is loaded into memory. In either case, the NavGetFile routine in the NSIM is then executed. Thus, in operation, the actual code for implementing NavGetFile is dynamically loaded into memory "just in time" according to the invention.

The invention can be further employed within a routine in a library implementation module to achieve more advantages at a lower level of granularity. For example, a routine in the library implementation module may itself need one or more other software libraries in order to execute. In that case, a library structure can be provided for each of the other software libraries, thereby allowing dynamic just-in-time loading of those other software libraries.

An example of this in Navigation Services can be found in the NavGetFile routine. Part of the functionality provided by the NavGetFile routine is to retrieve a specified software object, e.g. a file, database record, FTP object. The code to access a particular object, such as an FTP object, may be contained in another software library, such as an FTP server library. Since the code is only used to retrieve FTP objects, it is not desirable to have the FTP server library code occupy memory unless the retrieval of an FTP object or other FTP server routine is to occur. In this case, Navigation Services advantageously uses the invention to dynamically "just-in-time" load the FTP server library when it is needed to implement retrieval of an FTP object. A library structure is created for the FTP server library and the library structure is advantageously used as previously described above.

Although in Navigation Services the NS Loader contains an entry point for virtually every Navigation Services API, in other applications, embodiments or implementations, the invention can be selectively applied to software libraries. The selective application of the invention can be based on the relative size of the software library and amount or frequency of usage of the routines in the library. The larger the binary code and the less frequent the usage, the more advantageous it is to use the invention.

Although the invention has been described with respect to a conventional computer system, the invention is not limited to this specific environment. The invention can be employed in other hardware/software environments, including, but not limited to, cellular phones, cable boxes, office copiers and other embedded systems.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

The invention claimed is:

1. A computer system for dynamically and automatically loading and unloading a software library to and from memory in a computer, said software library including one or more library routines and capable of being referenced by an application or other software module, said computer system comprising:
   one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and
   software to perform operations comprising
      determining which libraries are potentially needed during execution of the application or other software module;

loading into memory a library loader for each potentially needed library, said loading occurring anytime before any library of the potentially needed library is executed by the application or other software module;

loading into memory a library implementation module for a software library, said loading occurring prior to when a library routine of the software library is to be executed by the application or other software module;

executing the loaded library implementation module for the library routine being executed; and automatically unloading from memory the library implementation module after the execution of the library routine is completed while keeping the library loader in memory until the execution of the application or the other software module is completed, wherein the software library is scheduled to be unloaded automatically without an explicit unload request from the application or other software module and without using a count.

2. The computer system as defined in claim 1 wherein said loading of a library loader for each potentially needed library occurs either just prior to or contemporaneous with the execution of the application or other software module.

3. The computer system as defined in claim 1 wherein said loading of a library loader for each potentially needed library occurs after execution of the application or other software module begins but before any library routine of the potentially needed library is executed by the application or other software module.

4. A computer system for dynamically and automatically loading and unloading a software library to and from memory in a computer, said computer library including one or more library routines and capable of being referenced by an application or other software module, said computer system comprising:

one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and software to perform operations comprising loading into memory a library implementation module for a software library, said loading occurring prior to when a library routine of the software library is to be executed by the application or other software module, said loading comprising determining whether the library implementation module is in memory;

if the library implementation module is not in memory, then loading the library implementation module; and if the library implementation module is in memory and scheduled to be unloaded from memory, then canceling the scheduled unloading of the library implementation module;

executing the loaded library implementation module for the library routine being executed; and automatically scheduling the unloading of the library implementation module after the execution of the library routine is completed, while keeping the library loader in memory until completion of the execution application or the other software module; and unless the scheduled unload has been cancelled, automatically unloading the library implementation module as scheduled, wherein the software library is scheduled for unload and unloaded automatically without an explicit unload request from the application or other software module and without using a count.

5. The computer system as defined in claim 4 wherein said loading of a library loader for each potentially needed library occurs either just prior to or contemporaneous with the execution of the application or other software module.

6. The computer system as defined in claim 4 wherein said loading of a library loader for each potentially needed library occurs after execution of the application or other software module begins but before any library routine of the potentially needed library is executed by the application or other software module.

7. The computer system as defined in claim 4 wherein said scheduling the unloading of the library implementation module includes delaying the unloading of the library for a specified delay and unloading the library implementation module upon completion of the delay.

8. The computer system as defined in claim 7 wherein said specified delay is a time delay.

9. The computer system as defined in claim 8 wherein time delay is fixed.

10. The computer system as defined in claim 8 wherein said time delay is variable.

11. The computer system as defined in claim 7 wherein said specified delay is based on system resources.

12. The computer system as defined in claim 4 wherein said scheduling the unloading of the library implementation module comprises comprises setting an associated criteria;

unsetting an associated criteria of said scheduled unloading is cancelled; and resetting the associated criteria of the library implementation module is again scheduled for unloading.

13. A computer system for dynamically and automatically loading and unloading a software library to and from memory in a computer, said software library capable of being referenced by an application or other software module, said computer system comprising:

one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and software to perform operations comprising loading a software library into memory; and automatically unloading said software library from memory after completion of execution of said library routine, while keeping the library loader in memory until completion of the execution of the application or the other software module, wherein the software library is scheduled to be unloaded automatically without an explicit unload request from the application or other software module and without using a count.

14. The computer system of claim 13 wherein said unloading of said software library comprises scheduling the unloading of the library implementation module;

setting an associated criteria;

checking whether said set associated criteria has been met; and unloading the library implementation module if after said associated criteria has been met, said library implementation module is not being referenced by an application or other software module.

15. A computer system for dynamically loading a software library into memory in a computer, said software capable of being used by an application or other software module, said computer system comprising:

one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and an operating system or other software to perform operations comprising loading into memory a library implementation module for a software library containing a library routine, said loading occurring just prior to when said library routine is to be executed by the application or other software module, said loading comprising determining whether the library implementation module is in memory;

if the library implementation module is not in memory, then loading the library implementation module; and if the library implementation module is in memory and scheduled to be unloaded from memory, then canceling the scheduled unloading of the library implementation module;

executing the loaded library implementation module for the library routine being executed; and scheduling the unloading of the library implementation module after the execution of the library routine is completed, while keeping the library loader in memory until completion of the execution application or the other software module, wherein said scheduling the unloading of the library implementation module includes setting a time delay and unloading the library implementation module if after said time delay has been met and without using a count, said library implementation module is not in use.

16. The computer system as defined in claim 15 wherein said time delay is fixed.

17. The computer system as defined in claim 15 wherein said time delay is variable.

18. A computer system for dynamically loading a software library into memory in a computer, said software capable of being used by an application or other software module, said computer system comprising:

one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and an operating system or other software to perform operations comprising loading into memory a library implementation module for a software library containing a library routine, said loading occurring just prior to when said library routine is to be executed by the application or other software module, said loading comprising determining whether the library implementation module is in memory;

if the library implementation module is not in memory, then loading the library implementation module; and if the library implementation module is in memory and scheduled to be unloaded from memory, then canceling the scheduled unloading of the library implementation module;

executing the loaded library implementation module for the library routine being executed; and scheduling the unloading of the library implementation module after the execution of the library routine is completed, while keeping the library loader in memory until completion of the execution application or the other software module, wherein said scheduling the unloading of the library implementation module includes setting an associated criteria based on system resources and unloading the library implementation module if after said associated criteria has been met and without using a count, said library implementation module is not in use.

19. A computer system for dynamically loading a software library into memory in a computer, said software capable of being used by an application or other software module, said computer system comprising:

one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and an operating system or other software to perform operations comprising loading into memory a library implementation module for a software library containing a library routine, said loading occurring just prior to when said library routine is to be executed by the application or other software module, said loading comprising determining whether the library implementation module is in memory;

if the library implementation module is not in memory, then loading the library implementation module; and if the library implementation module is in memory and scheduled to be unloaded from memory, then canceling the scheduled unloading of the library implementation module;

executing the loaded library implementation module for the library routine being executed; and scheduling the unloading of the library implementation module after the execution of the library routine is completed, while keeping the library loader in memory until completion of the execution application or the other software module, wherein said scheduling the unloading of the library implementation module includes setting an associated criteria, unsetting an associated criteria if said scheduled unloading is cancelled, and resetting the associated criteria if the library implementation modules is again scheduled for unloading and without using a count.

20. A computer system for dynamically loading a software library into memory in a computer, said software capable of being used by an application or other software module, said computer system comprising:

one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and an operating system or other software to perform operations comprising loading into memory a library implementation module for a software library containing a library routine, said loading occurring just prior to when said library routine is to be executed by the application or other software module, said loading comprising determining whether the library implementation module is in memory;

if the library implementation module is not in memory, then loading the library implementation module; and if the library implementation module is in memory, then canceling the scheduled unloading of the library implementation module;

executing the loaded library implementation module for the library routine being executed; and scheduling the unloading of the library implementation module after the execution of the library routine is completed, while keeping the library loader in memory until completion of the execution application or the other software module, wherein said scheduling the unloading of the library implementation module includes setting an associated criteria, unsetting an associated criteria if said scheduled unloading is cancelled, and resetting the associated criteria if the library implementation modules is again scheduled for unloading and without using a count.

21. A computer system for dynamically loading a software library into memory in a computer, said software capable of being used by an application or other software module, said computer system comprising:

one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and an operating system or other software to perform operations comprising loading a software library into memory just prior to or contemporaneous with execution of a library routine in said software library; and unloading said software library from memory after completion of execution of said library routine, wherein said unloading of said software library includes scheduling the unloading of the library implementation module, while keeping the library loader in memory until completion of the execution application or the other software module, setting an associated criteria, checking whether said set associated criteria has been met, and unloading the library implementation module if after said associated criteria has been met and without using a count, said library implementation module is not in use.

22. A computer-readable medium having stored thereon instructions for causing a computer to perform operations comprising determining one or more software libraries which are potentially needed during execution of an application or other software module;

loading into memory a library loader for each potentially needed library, said loading occurring after execution of the application or other software module begins but before any library routine of the potentially needed library is executed by the application or other software module;

loading into memory a library implementation module for a software library containing a library routine, said loading occurring just prior to when said library routine is to be executed by the application or other software module;

executing the loaded library implementation module for the library routine being executed; and automatically unloading from memory the library implementation module after the execution of the library routine is completed, while keeping the library loader in memory until completion of the application or the other software module, wherein the library implementation module is scheduled to be unloaded from memory and without using a count.

23. A computer-readable medium having stored thereon instructions for causing a computer to perform operations comprising determining one or more software libraries which are potentially needed during execution of an application or other software module;

loading into memory a library loader for each potentially needed library, said loading occurring anytime before any library of the potentially needed library is executed by the application or other software module;

loading into memory a library implementation module for a software library containing a library routine, said loading occurring just prior to when said library routine is to be executed by the application or other software module, said loading including determining whether the library implementation modules is in memory, if the library implementation module is not in memory, then loading the library implementation module, and if the library implementation module is in memory and scheduled to be unloaded from memory, then canceling the scheduled unloading of the library implementation module;

executing the loaded library implementation module for the library routine being executed; and scheduling the unloading of the library implementation module after the execution of the library routine is completed, while keeping the library loader in memory until completion of the execution application or the other software module, wherein said scheduling the unloading of the library implementation module includes setting a time delay and unloading the library implementation module if after said time delay has been met and without using a count, said library implementation module is not in use.

24. The computer-readable medium as defined in claim 23 wherein said time delay is fixed.

25. The computer-readable medium as defined in claim 23 wherein said time delay is variable.

26. A computer system for automatic unloading of a dynamically-loaded software library from memory in a computer, said software library including one or more library routines and capable of being referenced or otherwise invoked by an application or other software module, said computer system comprising:
- one or more libraries, each software library containing one or more library routines, each software library having a library loader and a library implementation module, the library loader specifying entry points corresponding to entry points in the software library and the library implementation module containing computer code to implement the software library, the library loader handling unloading the software library;
- means for loading into memory a library loader for each potentially needed library, a library loader for a library being loaded by the time the application or other software module executes a routine in that library;
- means for loading into memory a library implementation module for a software library, said loading occurring prior to when a library routine of the software library is executed by the application or other software module, said loading handled by the library loader for the software library;
- means for determining whether any application or other software module is referencing the software library; and
- means for automatically unloading the software library from memory after the execution of the library routine is completed, while keeping the library loader in memory until completion of the execution application or the other software module if it is determined that the software library is not being referenced by any application or other software module, wherein the software library is scheduled to be unloaded automatically without an explicit unload request from the application or other software module and without using a count.

27. A computer system for automatic unloading of a dynamically-loaded software library from memory in a computer, said software library including one or more library routines and capable of being referenced or otherwise invoked by an application or other software module, said computer system comprising:
- one or more libraries, wherein each of the one or more libraries includes a library implementation module containing code for implementing the corresponding software library and a library loader containing entry points corresponding to entry points of the corresponding software library and code for loading and unloading the corresponding library implementation module, the library implementation module containing one or more library routines
- means for determining whether any application or other software module is referencing the software library; and
- means for automatically unloading the software library from memory after the execution of the library routine is completed, while keeping the library loader in memory until completion of the execution application or the other software module if it is determined that the software library is not being referenced by any application or other software module, wherein the software library is scheduled to be unloaded automatically without an explicit unload request from the application or other software module, wherein said means for automatically unloading the software library comprises means for delaying the unloading of the software library for a specified delay and means for unloading the software library upon completion of the delay and without using a count.

28. The computer system as defined in claim 27, wherein said means for automatically unloading the software library further comprises:
- means for determining at completion of the delay whether the software library is being referenced by an application or other software module; and
- means for unloading the software module only if the software library is not being referenced by an application or other software module.

29. The computer system as defined in claim 27 further comprising:
- when an application or other software module references or otherwise invokes a routine in a software library, means for determining whether the software library is subject to a delayed unloading; and
- if the software library is subject to a delayed unloading means for canceling the delayed unloading.

30. The computer system as defined in claim 27 wherein said specified delay is a time-based delay.

31. A computer system for automatic unloading of a dynamically-loaded software library from memory in a computer, said software library including one or more library routines and capable of being referenced or otherwise invoked by an application or other software module, said computer system comprising:
- a processor;
- a memory;
- a disk;
- one or more software libraries stored on said disk, wherein each of the one or more software libraries includes a library implementation module containing a code for implementing the corresponding software library and a library loader containing entry points corresponding to entry points of the corresponding software library and the code for loading and unloading the corresponding library implementation module, the library implementation module containing one or more library routines;
- software operated on by said processor to perform operations comprising:
  - determining whether any application or other software module is referencing the software library; and
  - automatically unloading the library implementation module from memory after the execution of the library routine is completed, while keeping the library loader in memory until completion of the execution application or the other software module if it is determined that the software library is not being referenced by any application or other software module, wherein the software library is scheduled to be unloaded automatically without an explicit unload request from the application or other software module and without using a count.

32. The computer system as defined in claim 31 wherein said software library is comprised of a library loader and a library implementation module, the library loader specifying entry points corresponding to entry points in the software library and the library implementation module containing computer code to implement the software library, the library loader handling unloading the software library, said software performing operations comprising:
- loading into memory a library loader for each potentially needed library, a library loader for a library being loaded by the time the application or other software module executes a routine in that library; and
- loading into memory a library implementation module for a software library, said loading occurring just prior to when a library routine of the software library is executed by the application or other software module, said loading handled by the library loader for the software library.

33. The computer system as defined in claim 31 wherein said automatically unloading the software library comprises delaying the unloading of the software library for a specified delay and unloading the software library upon completion of the delay.

34. The computer system of claim 33 further comprising
when an application or other software module references or otherwise invokes a routine in a software library, determining whether the software library is subject to a delayed unloading; and
if the software library is subject to a delayed unloading canceling the delayed unloading.

35. The computer system as defined in claim 33 wherein said specified delay is a time-based delay.

36. The computer system as defined in claim 31, said automatically unloading the software library further comprises
determining at completion of the delay whether the software library is being referenced by an application or other software module; and
unloading the software module only if the software library is not being referenced by an application or other software module.

37. A computer-readable medium having stored thereon instructions for causing a computer to perform operations comprising:
loading a software library into memory, wherein the software library comprises a library implementation module containing code for implementing the corresponding software library and a library loader containing entry points corresponding to entry points of the corresponding software library and code for loading and unloading the corresponding library implementation module; and
automatically unloading said library implementation module from memory after completion of execution of said library routine, while keeping the library loader in memory until completion of the execution application or the other software module, wherein the automatically unloading includes delaying the unloading for a delay period and canceling a delayed unloading of a software library if a library routine of the software library is referenced by an application or other software module during the delay period and without using a count.

38. A computer system for dynamically loading a software library into memory in a computer, said software capable of being used by an application or other software module, said computer system comprising:
one or more library structures, each library structure corresponding to a software library, each library structure including a library implementation module containing code for implementing the corresponding software library and a library loader containing entry points corresponding to entry points of the corresponding software library and code for loading and unloading the corresponding library implementation module; and
an operating system or other software operations comprising
determining which libraries are potentially needed during execution of the application or other software module;
loading into memory a library loader for each potentially needed library, said loading occurring after execution of the application or other software module begins but before any library routine of the potentially needed library is executed by the application or other software module;
loading into memory a library implementation module for a software library containing a library routine, said for a software library containing a library routine is to be executed by the application or other software module;
executing the loaded library implementation module for the library routine being executed; and
unloading from memory the library implementation module after the execution of the library routine is completed, while keeping the library loader in memory until the execution of the application or the other software module is completed, wherein the library implementation module is scheduled to be unloaded automatically and without using a count.

* * * * *